United States Patent
Bodurtha et al.

(10) Patent No.: US 7,212,993 B1
(45) Date of Patent: May 1, 2007

(54) SECURITY RECEIPTS MANAGEMENT SYSTEM

(75) Inventors: Stephen G. Bodurtha, Stamford, CT (US); Satyanarayan Chada, New York, NY (US); Mitchell M. Cox, Towaco, NJ (US); Thomas W. Lee, Levittown, NY (US)

(73) Assignee: Merrill Lynch & Co., Inc., New York, NY (US)

( * ) Notice: Subject to any disclaimer, the term of this patent is extended or adjusted under 35 U.S.C. 154(b) by 0 days.

(21) Appl. No.: 09/574,294

(22) Filed: May 19, 2000

Related U.S. Application Data

(60) Provisional application No. 60/145,730, filed on Jul. 27, 1999.

(51) Int. Cl.
*G06Q 40/00* (2006.01)

(52) U.S. Cl. .................................................. 705/35

(58) Field of Classification Search .................. 705/35, 705/36, 37
See application file for complete search history.

(56) References Cited

U.S. PATENT DOCUMENTS

| | | | |
|---|---|---|---|
| 4,346,442 A | 8/1982 | Musmanno | |
| 4,376,978 A | 3/1983 | Musmanno | |
| 4,597,046 A | 6/1986 | Musmanno et al. | |
| 4,674,044 A | 6/1987 | Kalmus et al. | |
| 4,700,297 A | 10/1987 | Hagel, Sr. et al. | |
| 4,774,663 A | 9/1988 | Musmanno et al. | |
| 4,953,085 A | 8/1990 | Atkins | |
| 5,101,353 A * | 3/1992 | Lupien et al. | 340/825.26 |
| 5,126,936 A | 6/1992 | Champion et al. | |
| 5,206,803 A | 4/1993 | Vitagliano et al. | |
| 5,235,507 A | 8/1993 | Sackler et al. | |
| 5,262,942 A * | 11/1993 | Earle | 705/35 |
| 5,270,922 A | 12/1993 | Higgins | |
| 5,297,032 A | 3/1994 | Trojan et al. | |
| 5,671,363 A * | 9/1997 | Cristofich et al. | 705/37 |
| 5,765,144 A | 6/1998 | Larche et al. | |
| 5,774,880 A | 6/1998 | Ginsberg | |
| 5,781,654 A | 7/1998 | Carney | |
| 5,806,048 A | 9/1998 | Kiron et al. | |
| 5,806,049 A | 9/1998 | Petruzzi | |
| 5,826,243 A | 10/1998 | Musmanno et al. | |
| 5,878,258 A | 3/1999 | Pizi et al. | |
| 5,884,285 A * | 3/1999 | Atkins | 705/35 |

(Continued)

FOREIGN PATENT DOCUMENTS

WO    WO 9527945 A1 * 10/1995

OTHER PUBLICATIONS

"Is Merrill Lynch Tipping Its Hand With HOLDRs?" article, Will McClatchy editor, Mar. 6, 2000□□.*

(Continued)

*Primary Examiner*—Jagdish Patel
*Assistant Examiner*—James M. Alpert
(74) *Attorney, Agent, or Firm*—Morgan, Lewis & Bockius LLP; James M. Bollinger; Steven D. Underwood

(57) ABSTRACT

A computer system for managing, creating, and support of a novel investment instrument, known as a Security Receipt. This receipt provides translation of ownership of plural underlying securities to the holder of the receipt in a seamless and efficient way. The system permits enhanced security creation, and orderly support to facilitate liquidity and market trading of the Security Receipt.

10 Claims, 8 Drawing Sheets

U.S. PATENT DOCUMENTS

| | | | |
|---|---|---|---|
| 5,890,141 A | | 3/1999 | Carney et al. |
| 5,893,079 A | * | 4/1999 | Cwenar ........................ 705/35 |
| 5,905,974 A | | 5/1999 | Fraser et al. |
| 5,911,136 A | * | 6/1999 | Atkins .......................... 705/35 |
| 5,940,809 A | | 8/1999 | Musmanno et al. |
| 5,941,996 A | | 8/1999 | Smith et al. |
| 5,946,667 A | * | 8/1999 | Tull et al. ..................... 705/35 |
| 5,950,175 A | | 9/1999 | Austin |
| 5,963,923 A | * | 10/1999 | Garber ........................ 235/379 |
| 5,978,779 A | | 11/1999 | Stein et al. |
| 5,983,196 A | * | 11/1999 | Wendkos ..................... 705/14 |
| 5,983,204 A | | 11/1999 | Debe |
| 5,987,435 A | * | 11/1999 | Weiss et al. .................. 705/35 |
| 6,014,642 A | | 1/2000 | El-Kadi et al. |
| 6,016,482 A | | 1/2000 | Molinari et al. |
| 6,026,438 A | | 2/2000 | Piazza et al. |
| 6,044,371 A | | 3/2000 | Person et al. |
| 6,047,324 A | | 4/2000 | Ford et al. |
| 6,088,685 A | | 7/2000 | Kiron et al. |
| 6,381,585 B1 | * | 4/2002 | Maples et al. ............. 705/36 R |
| 6,601,044 B1 | * | 7/2003 | Wallman ................... 705/36 R |
| 2005/0060254 A1 | * | 3/2005 | Jones .......................... 705/36 |

OTHER PUBLICATIONS

"Merrill Lynch Launches Single Security Representing 20 Internet Stocks" article, New York, Sep. 22, 1999.*

Merrill Lynch Introduces Single Security Representing 20 Biotech Stocks article, New York (Business Wire) Nov. 22, 1999.*

"A Foolish Review of HOLDRs", by Bill Mann, Feb. 2, 2000.*

"Amex Vendor Alerts", Amex Vendor Alert#1999-1, Sep. 29, 1999.*

"With Newest HOLDRs, Merrill Lynch Aims To Offer The World" article by Dagen McDowell, Aug. 8, 2000The trustee holds title to security receipt and coordinates transactions through a Depository Trust Company ().*

Bloomberg, Tuesday, Jul. 28, 1998 article, 2 pages.*

"Certain Legal Aspects Of Secondary Market Municipal Derivative Products" article, Business Lawyer, 49, n4, 1629-1689, Aug. 1994.*

Telebras HOLDRs Information Circular, Georgeson & Company Inc, Jun. 30, 1998, pp. 1-8.*

Definition of "beneficial interest", Law.com Dictionary, printed Sep. 25, 2006, original publish date unknown.*

Definition of "HOLDR", Investopedia.com, printed Sep. 29, 2006, original publish date unknown.*

Mann, Bill, A Foolish Review of HOLDRs, The Motley Fool (www.fool.com), printed on Sep. 28, 2006, and originally published on Feb. 2, 2000.*

Ghosh, Palash, Know When to HOLDR, Business Week Online, printed Sep. 28, 2006 and originally published on Aug. 22, 2005.*

Pratt, Tom, Bear's new "CUBS" are a hit, trading above seeming value, Investment Dealers Digest, vol. 61, No. 33, pp. 11-12, Aug. 14, 1995.*

Brochure titled "Select Sector SPDRs"—"Benchmark Sector-Based Equity Portfolios of Companies in the S&P 500".

Prospectus titled "The Select Sector SPDR Trust", dated Dec. 16, 1998.

Index Components titled "Select Sector SPDRs", (NASDAQ AMEX), as of Apr. 1, 1999.

Indicative Term Sheet for "Internet HOLDRS" by Merrill Lynch; date unknown.

Memorandum to Files -Summary of Regulatory Issues, by Shearman & Sterling, dated Mar. 25, 1999.

Letter to the Securites and Exchange Commission, from the Bank of New York, Attention Chief Counsel, Division of Corporate Finance regarding the Bank of New York-Domestic Holdrs Receipts, dated Apr. 14, 1999.

Securities And Exchange Commission, Form S-1-Registration Statement For "ABC Trust Series 1999-A," Filed May 14, 1999.

Securities And Exchange Commission, Form S-1-Registration Statement For "ABC Trust Series 1999 A", Amendment No. 1, Filed Jun. 18, 1999.

Telebras Holdrs-Transaction Documents; dated from approximately Jul. to Oct. of 1998. Illustrative documents include: a) Letter to Telebras Shareholders-Jun. 30, 1998; b) Information Circular-Jun. 30, 1998; c) Letter of Instruction-Jun. 30, 1998; d) Conversion Instructions; and (e) Lexis search printout.

"Executive Summary-Internet HOLDRS", Merrill Lynch, date unknown.

Securities and Exchange Commission. Comments regarding Merrill Lynch's previously submitted. Form S-1 of May 14, 1999; SEC Comments dated Jun. 11, 1999.

Letter from Shearman & Sterling; Attention Douglas J. Scheidt, Esq, Chief Counsel, Division of Investment Management, Securities and Exchange Commission, regarding Interpretive Request for a Depositary Receipts Program; dated May 19, 1999.

Letter from Shearman & Sterling to the Securities and Exchange Commission. (Catherine T. Dixon, Chief Counsel, Divison of Corporation Finance) regarding Request for Relief from Exchange Act Reporting Requirements for a Depositary Receipts Program, dated May 20, 1999.

Letter from Shearman & Sterling to the NASD, Regulation, Inc. regarding HOLDRs Trust Series 1999-A dated May 17, 1999.

PR Newswire; Dec. 28, 1993, Section: Financial News; Standard & Poor's Depositary Receipts-Volume Surpasses 50 Million Mark for the Year.

Securities Week; Aug. 16, 1993; Section: Special Supplement; vol. 20, No. 33; p. 6; Spiders, One of Top Five Most Actively Traded Securities, Ready for Spin-Off.

Cashflow Magazine; Dec. 1993; vol. 14, No. 13; p. 5; ISSN: 1040-0311; SPDR web ensnares both active, passive fund managers; Standard & Poor's 500 Depository Receipts; Investments & Benefits.

PR Newswire; Jan. 25, 1993; Section: Financial News; New Breed of Security, SPDRs Or "Spiders," To Weave its Web at the Amex; Amex expects to launch Standard & Poor's Depositary Receipts on Jan. 29.

The Nikkei Weekly; Oct. 31, 1994; Banks failing to take advantage of new business opportunities; Outdated Accounting Practices, Reluctance to Change Cloud Diversification Prospects by, Kazuhito Ikeo.

Information regarding AT&T (Unit Investment Trust), by Merrill Lynch.

Nerac Computerized Database Search Printout Result—Search Term: "SECTOR SPDR", Search performed Feb. 13, 2001.

Spinning a Different Mutual Fund; by Berg, Joel; Central Penn Business Journal; vol. 16 No. 15; Date Apr. 14, 200; p. 3.

The American Stock Exchange Appoints Clifford Weber SVP of New Product Development; PR Newswire; Date: Apr. 4, 2000, p. 1.

Sector Funds Deliver Bang For Investors; Arizona Republic; Date Feb. 7, 1999; p. D.1.

State Street announces new index funds; Mutual Fund Market News; vol. VII No. 1; Date Jan. 4, 1999; p. 5.

State Street Spins Out a New SPDR; Bank Investment Services Report; vol. 6, No. 42; Date Nov. 2, 1998; p. 3.

If You Can't Beat the Oil Barons, Join'em; How to invest in a slippery sector; by Peter Coy; Business Week; No. 3703; Date Oct. 16, 2000; p. 206-210.

Along came a SPDR; by Dolly Setton; Forbes; vol. 163, No. 4; Date Feb. 22, 1999; p. 163, 1 page(s).

Slicing and dicing the S&P 500 by Anne Tergesen and Amy Dunkin; Business Week; No. 3612; Date Jan. 18, 1999; p. 110.

DiaSys Corporation Lists On The American Stock Exchange; Date Dec. 15, 2000; p. 2353.

On RadioWallStreet.com: Freedom Capital's Market and Industry Outlook; Date Dec. 5, 2000; p. 2618.

The American Stock Exchange Lists UBS AG 18.5% Goals Linked to Motorola, Inc; PR Newswire; Date Nov. 22, 2000; p. 2523.

American Stock Exchange Lists Seven New Index Funds; Amex Continues to Expand its $55 Billion ETT Marketplace By listing streetTRACKS(SM); PR Newswire; Date Sep. 29, 2000; p. 0460.

State Street Global Advisors Reduces Fees On the Nine Select Sector SPDR 'Spider' Funds by Fifty Percent; Business Wire; Date May 22, 2000; p. 0644.

Intelliworxx Adds Three New Members to Board of Directors; Newswire; Date Mar. 24, 2000; p. 1132.

State Street Global Advisors Announces Success of SPDR 'Spider' Fund leads to Lower Fees; Newswire; Date Mar. 14, 2000; p. 0254.

Exchange-Traded Fund Innovator Gary Gastineau Joins Nuveen; Newswire; Date Mar. 7, 2000; p. 1395.

CHX Begins Trading Popular Nasdaq-100 Index Product; Newswire; Date Jul. 13, 1999; p. 0172.

Memorandum to Jim Bollinger from Chris Pennisi; Re Mutual Fund/Exchange Traded Fund Article Montage; Date Feb. 9, 2001.

California-Energy; (CE) California Energy Company Inc. postpones $175 million LYONs offering; Business Wire; Business Editors and Energy Writers; Date Mar. 30, 1989.

The Bond Buyer; Section: Corporate Securities; Prices Mark Time through dull Session; RTC Details its $3.7 Billion Junk Holding; by David Gillen; Date Jul. 20, 1990.

Merrill Lynch to commence tender offer for Lyons due Feb. 21, 2006; PR Newswire; Section: Financial News; Date Oct. 3, 1991.

Merrill Lynch Completes Lyons Tender Offer; PR Newswire; Section: Financial News; Date Nov. 7, 1991.

Investment Dealer's Digest; Section: Capital Market; p. 13; Headline: Elan Corp. sets Lyons deal through Bermuda finance sub; Merrill's backlog builds after long drought; Date Sep. 14, 1992.

Investment Dealers'Digest; Date Oct. 19, 1992; Capital Markets; p. 12; Headline: Merrill struggles to place Valhi's exchangeable Lyons; Deal offers highest yield ever on a Lyons.

Instituational Investor; Section: Deals of the Year; p. 107; Headline: Derivatives; Steers Charge onto the Scene; Date Jan. 1994.

Institutional Investor; Section: Deals of the Year; p. 105. Headline: Derivatives; Advantages for everyone; Date Jan. 1994.

Euromoney; Section: No. 311 p. 48-53; ISSN: 0014-2433; Assets enhanced by swaps; Date Mar. 1995.

CBS. MarketWatch.com—Mutual Understanding—ETFs Across the Water by Craig Tolliver.

Netscape "Get A Quote"—http://netscape/marketwatch.com—Quote for symbol:SPY.

\* cited by examiner

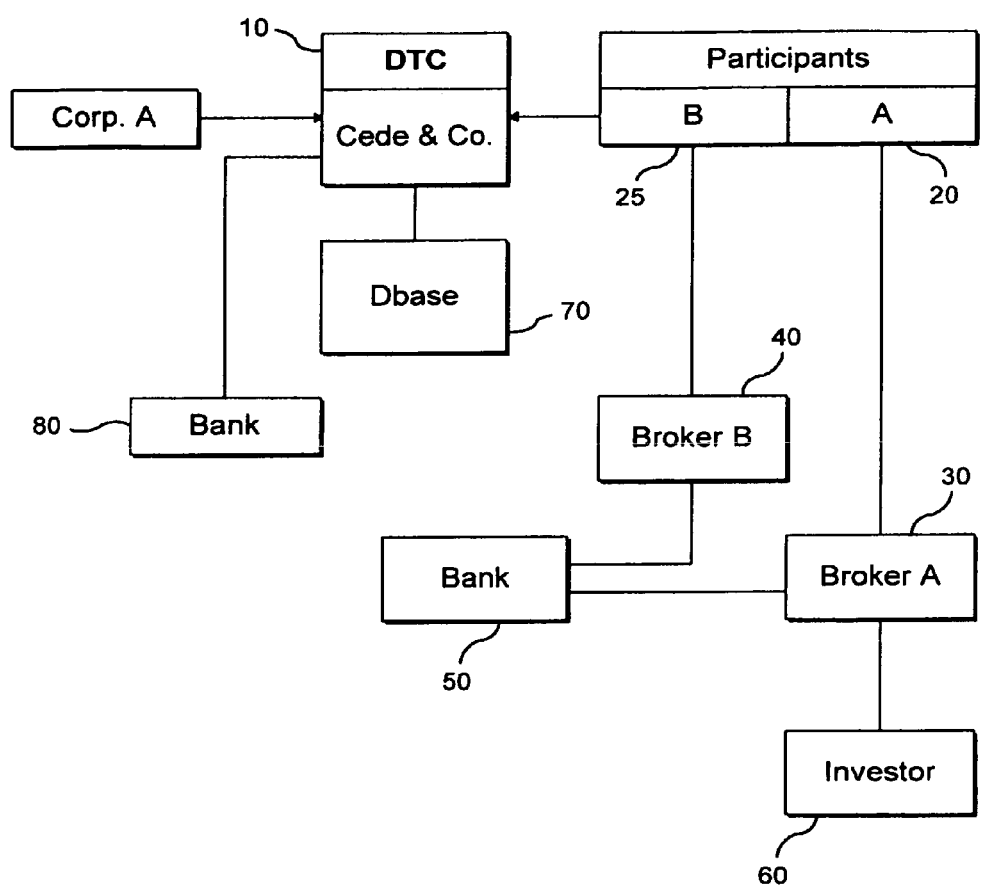
F I G. 1

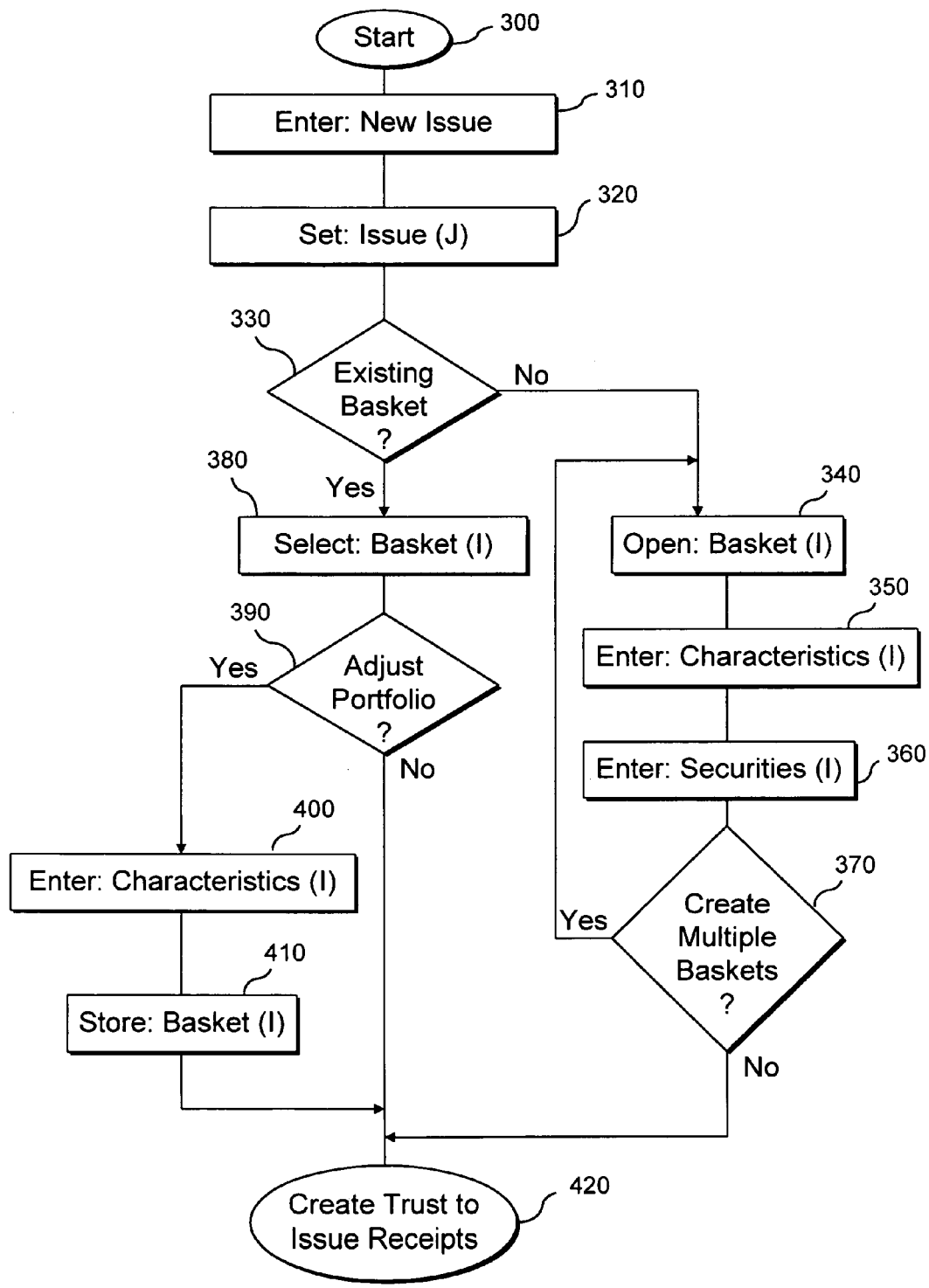
F I G. 4

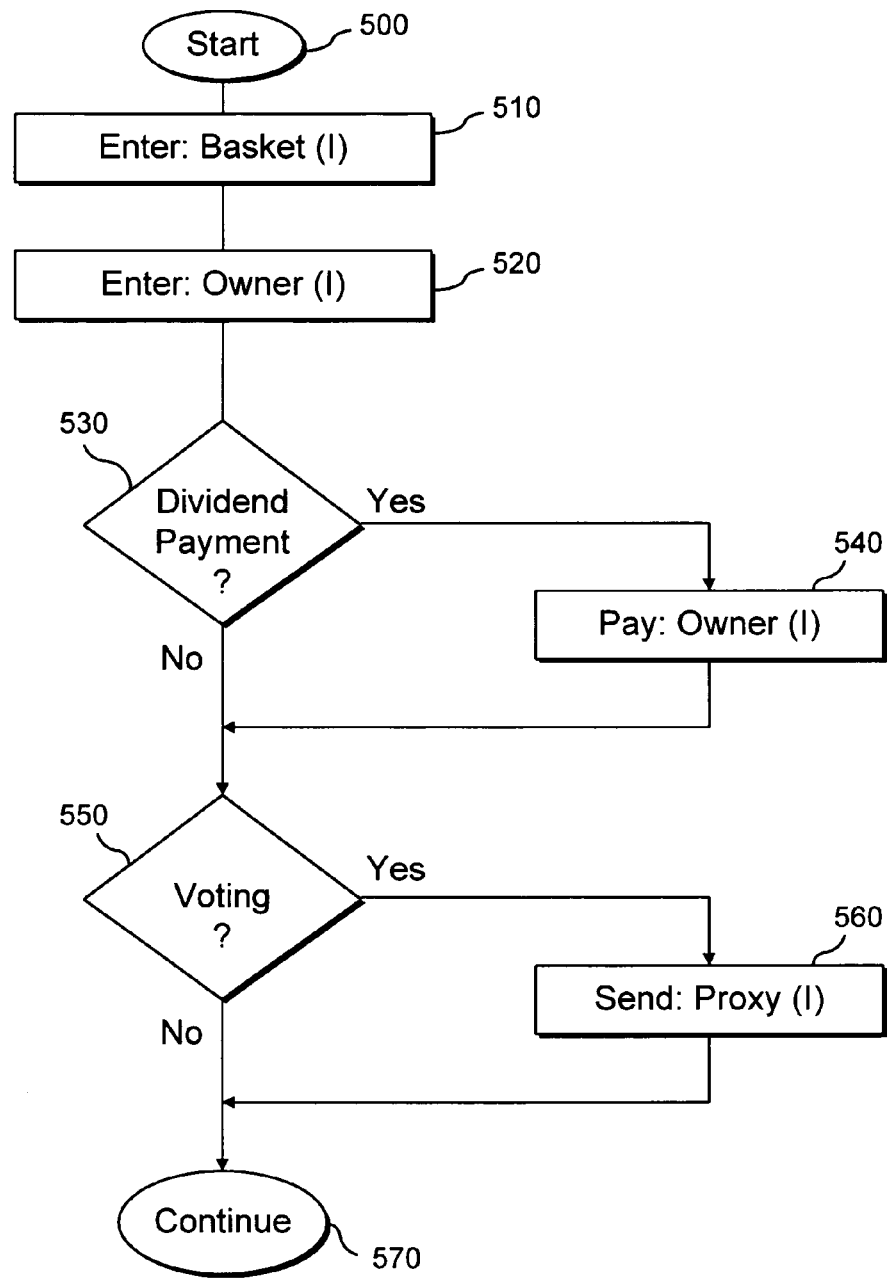
F I G. 5

SECURITY RECEIPTS MANAGEMENT SYSTEM

STATEMENT OF RELATED CASE

The present patent application is based upon Provisional Application No. 60/145,730, filed on Jul. 27, 1999, entitled SECURITY RECEIPTS MANAGEMENT SYSTEM, by Stephen G. Bodurtha, Thomas W. Lee, Satyanarayan Chada, and Mitchell M. Cox, the disclosure of which is incorporated herein by reference.

FIELD OF THE INVENTION

The present invention is directed to a system for creating and managing a novel investment instrument referred to herein as Security Receipts. In one aspect, the present invention is directed to the novel data processing systems and methods that create and manage this new class of investment instrument which permits exposure and investment in targeted baskets of underlying securities in a manner that directly replicates the experiences of owning the underlying securities. In a separate aspect of the present invention, the present invention is directed at this new class of investment instrument which gives investors the ability to buy and sell a single instrument having a unique and attractive matrix of properties which allow enhanced investment opportunities.

BACKGROUND OF THE INVENTION

The last decade has brought unprecedented appreciation in shareholder equity in the United States financial markets. This is evidenced by the explosive growth in the number and size of mutual funds, discount brokerages, equity-based retirement accounts and internet stock trading. The scope of investment participants with diverse investment goals has expanded greatly and includes professional investors and brokers, as well as retirees investing through on-line brokers via their personal computers, employees managing their 401 (k) accounts, and individual day traders.

In order to respond to the resulting increased demand for a wide range of investment products and services for equity investors, financial companies have heretofore reacted within the existing framework of investment vehicles by offering additional products and services. On the one hand, financial companies have offered pooled investment vehicles, like mutual funds, to cover many types of general and specialized investment strategies. On the other hand, financial companies have increased the choice of services available for investors through flexible investment plans, internet stock trading and modified commission structures.

Pooled investment vehicles provide investors with diversification and management, but this comes with certain trade-offs. Investors generally pay significant annual fees that typically increase with the appreciation of their investment. Additionally, it is now well known that for meaningful stretches of time, many managed mutual funds under-perform the unmanaged markets as reflected in one or more market indexes like the S&P 500. While index funds (mutual funds designed to track the performance of an index), like SPDRs, solve some of the problems faced by offering diversified exposure to an index at a cost that is lower than that of typical funds, they do not provide investors with ownership rights in the underlying securities.

Investors in pooled investment vehicles do not have ownership or control in the underlying securities to which they are exposed. As a result, investors give up investment discretion and expose themselves to potential tax liabilities as a result of trading activity in the investment vehicle by its manager or promoter. For example, if a fund manager sells highly appreciated stock in order to return money to other investors who liquidate their shares or because the fund manger has decided to change investments for another reason, the tax liability for that sale will be passed on to the remaining owners of the fund shares. This is especially problematic for new investors in the fund who will realize no gain from the prior appreciation of the stock but will be saddled with the resulting tax liability.

Flexible fee structures and automated, on-line stock purchasing abilities have given investors the opportunity to actively trade stocks, but also expose investors to greater risk. Investors can purchase single-stocks, but must make individual assessments of each stock to be purchased and in most types of brokerage accounts will be required to pay transaction fees for each stock transaction. This creates a disincentive for diversifying exposure to several stocks in each investment sector. Investors are not given the ability or the tools to effectively diversify their investment portfolio.

This diversification is very important to investors, and has driven many investors to the pooled investment vehicles described above. Over the past ten years, there has been a great proliferation of pooled investment vehicles offering exposure to all types of market sectors and investment themes.

There remains a need in the marketplace, however, for an investment that provides and permits flexible investing to promote risk control and diversification, while allowing investors to retain the benefits of beneficial ownership.

OBJECTS AND SUMMARY OF THE PRESENT INVENTION

It is an object of the present invention to provide a data processing system for creating and managing investment vehicles that permit diversified investing with full investor control and participation.

It is another object of the present invention to provide a method of initiating a new security in the form of a receipt that includes all the attributes of stock ownership, including voting and dividend rights.

It is another object of the present invention to provide a method by which a new security in the form of a receipt can be delivered in exchange for the underlying securities that the receipt represents and a method by which such underlying securities can be delivered in exchange for such receipt; in each case, such method of exchange would allow for such exchange to take place on a tax-free basis.

It is yet another object of the present invention to provide a method of supporting a market in a receipt corresponding to a diversified portfolio of securities, including a computer controlled trading and tracking system.

It is still another object of the present invention to provide a system for developing an initial basket of securities to support an investment receipt wherein said basket includes one or more securities that correspond to selected levels of trading volume and market capitalization.

It is yet another object of the present invention to provide a computer system to periodically track trading activity in Security Receipts and prepare reports on market transactions involving said Security Receipts.

It is a further object of the present invention to provide a novel investment vehicle corresponding to a basket of select securities that can be traded on a financial market.

It is a further object of the present invention to provide a method for trading interests in capitalized securities by establishing a tradable security corresponding to a select portfolio of publicly issued stocks and operating a financial market to bring together buyers and sellers of said security.

The above and other objects of the present invention are realized in a novel investment vehicle and computer system that permits commercial transactions of the vehicle in accordance with a stored protocol. The investment vehicle is a Security Receipt that is derived from a basket of underlying securities and transfers rights in the underlying securities to the holder of the receipt. These rights include essentially all the rights that shareholders receive in the securities had the investor bought the underlying shares, including voting rights, dividend income, etc. The computer system permits the creation and issuance of the Security Receipt with enhanced speed, efficiency and control. In addition, the computer system provides receipt maintenance to insure that the transferral of rights thereunder is properly implemented.

In accordance with the varying aspects of the present invention, the Security Receipt is available as a separate trading security. Trading support is thus provided for the Security Receipts and includes support for various options and future markets tied to the Security Receipt and the support needed for receipt owners to exchange their receipts for the underlying basket of securities.

The foregoing features of the present invention may be better understood by review of the following description of an illustrative example thereof, taken in conjunction with the drawings of which:

BRIEF DESCRIPTION OF THE FIGURES

FIG. 1 sets forth an illustrative prior art trading environment for securities;

FIG. 4 is a flowchart setting forth an operational sequence for creating a basket of securities for a receipt;

FIG. 5 is a flowchart setting forth an operational sequence for managing the receipts;

DETAILED DESCRIPTION OF THE INVENTION

Figure 2:
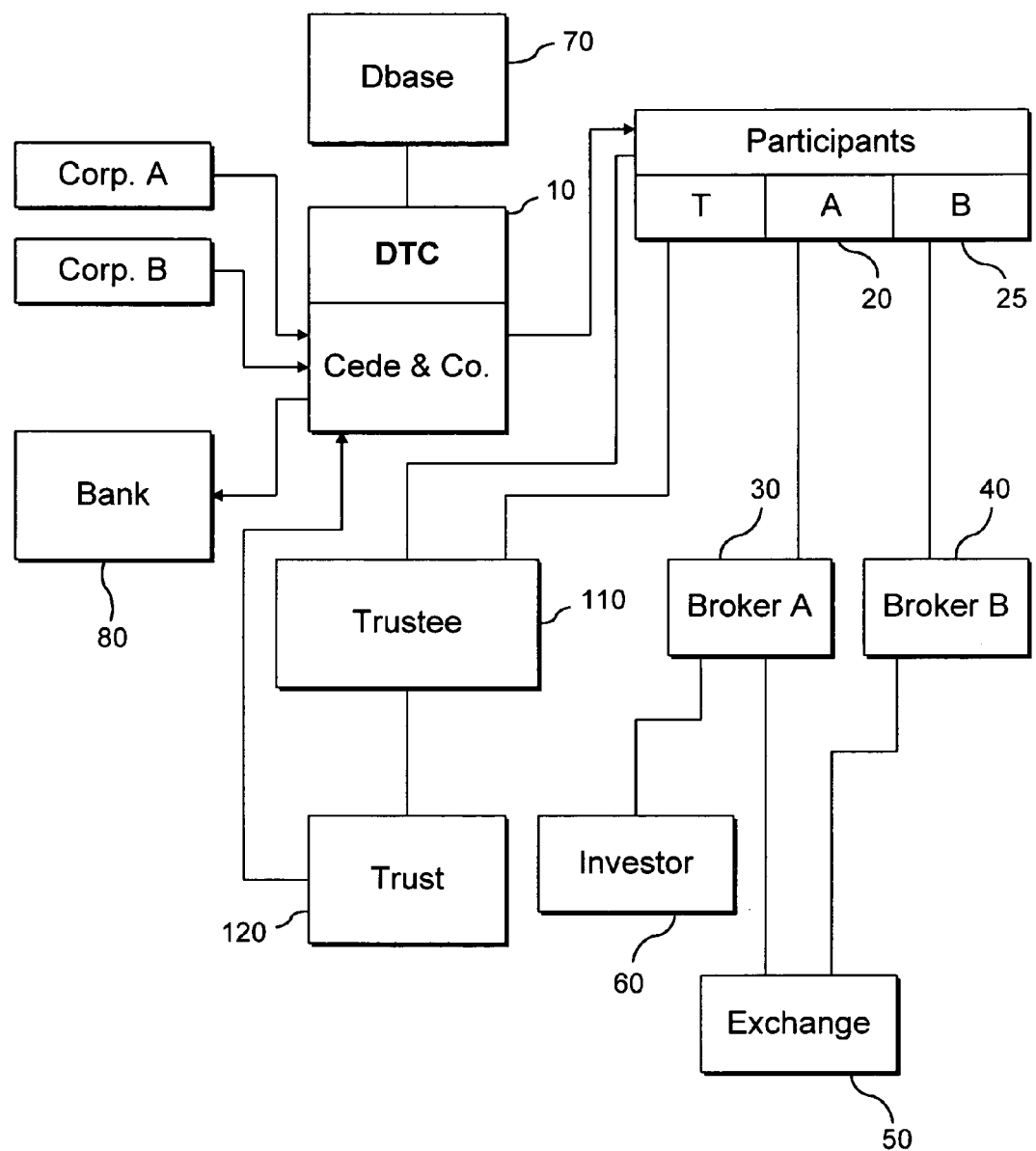
FIG. 2 depicts a trading environment for the creation and trading of the receipts as utilized in conjunction with the methods of the present invention.

In overview, the present invention is directed to a system for creating and managing a new class of investment vehicles, known as Security Receipts. Security Receipts are depository receipts issued by a Trust that are intended to provide investors with a less costly way to purchase, hold, and transfer securities, both debt and equity, and preferably U.S. equities. In particular, these Security Receipts are organized to include select securities corresponding to a wide range of investment objectives. For example, a Security Receipt may be used to establish ownership rights in a basket of stocks relating to the Oil Industry —and, therefore, is considered an energy sector Security Receipt.

Security Receipts are traded on one or more established exchanges, thus providing a market for investors to purchase and sell Security Receipts. An investor who owns a Security Receipt preferably has the same rights, privileges, and obligations as the investor having beneficial ownership of the stocks underlying the Security Receipt. This includes, for example, the right of the investor to vote the common stock and to receive dividends (if =declared by the issuer of the deposited security).

Keeping the above overview in mind, attention is now directed to FIG. 1. This Figure is an idealized functional block diagram of a prior art securities trading system, which is nonetheless useful in understanding the novel aspects of the present invention and the role of various participants in implementing Security Receipts in the context of the present invention.

Starting with Investors 60, whose interest in common stock investing is communicated with a Broker A, 30, a bid for a security is placed on the exchange and the security is purchased (Day 1), from a second Broker B, 40. This communication may take place using, for example, personal computers (PCs) connected to one or more computer networks. Alternatively, Investor A's request to purchase and ultimately purchase may be communicated via telephone, wireless connection, or similar, with alternate forms of communication equally applicable. At this time, no funds or shares are immediately exchanged, as this will take place in the future (three days later by current convention) on the settlement day (e.g., Day 4).

The sale is recorded by the broker. Here, each broker may be a Participant 20 or, otherwise, operates through a Participant. The Participants are collectively connected to a stock clearing entity, known as the Depository Trust Co. or "DTC"; 10 in FIG. 1. DTC further includes a nominee known as "Cede & Co." that acts as a record holder for securities that are traded between members of DTC. Cede & Co. uses Bank 80 for account support, and operates a records database 70 for monitoring the positions for individual securities for each of the Participants. As shown in FIG. 1, each broker conducts the transaction through its related Participant (Broker A with Participant A); as shown, this may include two different Participants 20 and 25, or a Broker may also be a Participant, or both Brokers may use the same Participant.

In the above discussion, purchase of shares in a stock of Corp. A by Investor 60 changes the positions of Broker A and Broker B by that particular transaction. In particular, Broker A increases its interest in the holdings of Corp. A stock by while Broker B's interest is reduced by a like amount so that the database reflects the increased interest of Broker A in the database records of holdings of Participant A, and the decreased interest of Broker B is reflected in the database records of the holdings of Participant B. While shown for a single security, it will be recognized that, in fact, the position adjustment for participants is done on an aggregated basis for all investors trading. The Investor's interest in the purchased securities is reflected via their respective brokerage accounts.

Continuing with FIG. 1, Corp. A may declare a dividend (stock and/or cash) or seek votes on corporate affairs by its shareholders. The payment of dividends is made to the shareholders of record and this is Cede & Co. DTC distributes these dividends to its Participants and these are ultimately credited to investors' accounts maintained by each Broker.

A similar approach is undertaken with voting rights. Corp. A distributes proxy statements to Cede & Co. for release—ultimately—to the shareholder investor 60. The shareholder/investor then exercises the common share voting right by responding to the proxy ballot.

Turning now to FIG. 2, the above-described conventional arrangement is re-configured for implementing the Security Receipts of the present invention. As shown in this Figure, a Trust is established, and this Trust 120, controlled by Trustee 10, issues a quantity of Security Receipts based on its ownership of a basket (a collection) of securities; for ease of discussion and in accord with the preferred embodiment, the Security Receipts represents common stock shares as traded on one of the primary United States financial markets, e.g., The New York Stock Exchange. Specifically, the securities are purchased and title is reflected at Cede & Co. in the name of Participant T, which relates the same to the Trustee of the Trust 120. Concurrently, Trust 120 issues the corresponding Security Receipts for sale by participating brokers, e.g., Brokers A and B.

As an example, an investor 60, desiring to invest in a particular industry, purchases a quantity of Security Receipts—just as the investor would a stock—from the broker via the trading exchange 50. The various ownership interests are recorded at Cede & Co. reflecting the new balance in Security Receipts between Participants A and B (who represent, respectively, selling Broker B and buying Broker A). The information is tracked and stored in database 70. The Trustee, the Broker, and/or the Participant may be the same entity, or some subset (e.g., the Broker and the Participant, or the Trustee and the Participant) may be the same entity.

As dividends are paid by Corp. B, and if Corp. B is a stock that is part of the basket of securities defining the Security Receipt and held in Trust 120, Cede & Co. records payment of these dividends to the Participant T, who relates the dividends to the Trustee for the Trust. However, the Trust 120 merely returns this dividend income directly to the true owners of the Security Receipts, via Cede & Co., and through the Brokers to the investors in the Security Receipts. In actuality, positions of Cede & Co. between members are merely consolidated, with net payments provided to the Brokers representing owner-clients.

A similar process transfers voting rights from the various corporations, through Cede & Co. to the Trust 120, and ultimately to the investors in the Security Receipts, thus allowing their participation in corporate management. The distribution of such votes is handled similarly to that just described for dividend payments, except that an additional subsystem is, in the preferred embodiment, employed to track ownership of the Security Receipts at the same time ownership of the underlying securities is tracked. This ownership information is then communicated directly to all Participants so that the vote of the underlying security represented by the Security Receipt can occur at the same time as the vote of the shares outside the trust. The Participant notifies the holder(s) of the Security Receipt (the investor) of the vote and the investor provides instructions to the company how to vote the shares. In practice, a third party may communicate this information to the investor, and may receive the vote information and communicate it to the company whose underlying security is part of the Security Receipt. In this way, all of the securities (both inside the Trust and outside) can be voted at the same time.

The operation of the system of FIG. 2 for managing and trading the Security Receipts mandates a communications mechanism between the various entities identified in FIG. 2 and the Trust. This communications mechanism encompasses any and all techniques for conveying information from one place to another including, for example, wireless communications, wired communications, computer networks, fiber optics, and others.

Figure 3A:
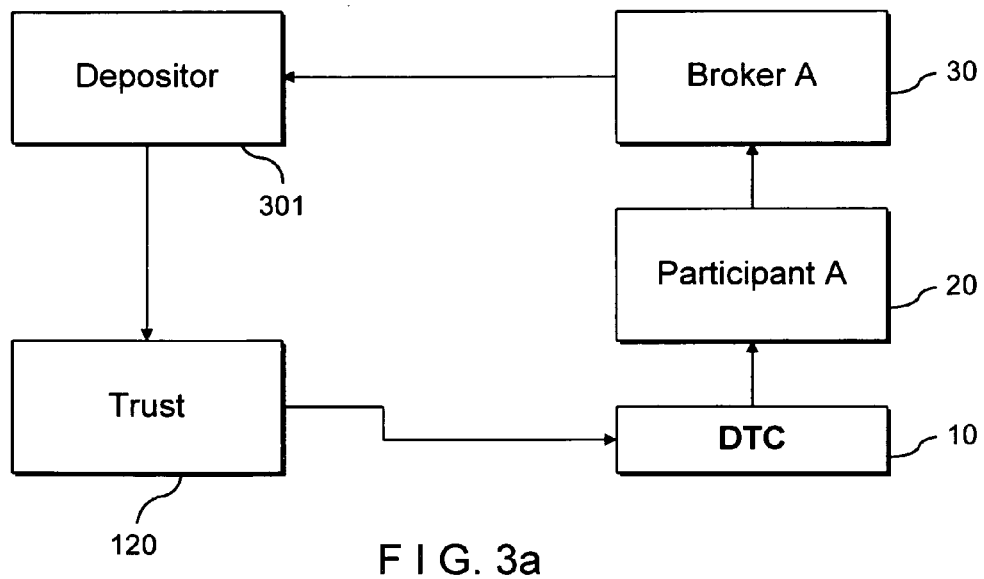
FIG. 3A depicts an idealized system overview for the creation of a Securities Receipt.

At the start, an Initial Depositor is the initiator of the Security Receipts and is responsible for setting up the Trust, organizing the basket of securities that are used to capitalize the receipt, and is ultimately responsible for finding buyers for the Security Receipts. One part of a system according to this invention enables the creation of a Security Receipt. As shown in FIG. 3A, a Depositor 301 (and for the initial issuance, the Initial Depositor), owner of one or more different securities in the same or different amounts, deposits the entire bundle of securities with the Trust 120. The Trust issues a Receipt for this bundle of securities to Cede & Co., and identifies its ownership with a Participant. The relevant Participant thereafter identifies the broker representing the Depositor. As with a typical stock, the Securities Receipt can be held by a Participant or Broker beneficially for the Depositor. Thus, the Initial Depositor has exchanged a bundle of one or more securities for Security Receipts representing the same, and the Security Receipts can be traded in the same manner as the underlying security(ies) are traded. Additionally, the number of shares of any particular security in the Security Receipt can be a fractional quantity. Thus, a single Security Receipt may represent 5 shares of one company, 2½ shares of a second company, and ⅞ths of a share of a third company.

The system further permits exchange of issued Security Receipts for the underlying securities corresponding to that Security Receipt. This is accomplished as depicted in FIG. 3A, with the distinction that the Security Receipt is surrendered to the Trust 120 by Depositor 301. The Trust cancels this Security Receipt and transfers the corresponding securities to DTC/Cede & Co., 10, with title acknowledged via Participant A and Broker A, back to Depositor 301. In this way, the system seamlessly permits low cost and efficient movement back to the original securities. By this mechanism, the market pricing of the Security Receipts are maintained within a defined amount to the market price of the underlying securities by the possibility of surrender/issue arbitrage.

Figure 3B:
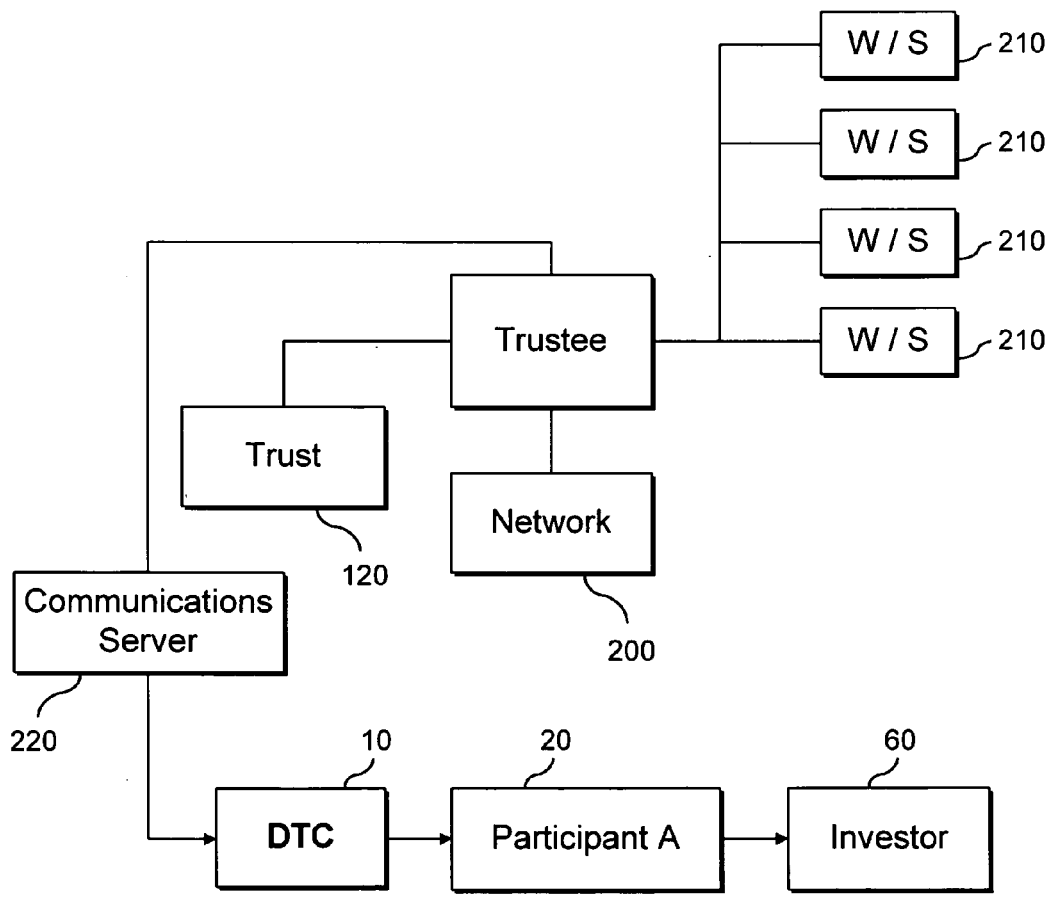
FIG. 3B depicts an idealized system for the management and trading of Securities Receipts.

In one preferred arrangement, the Initial Depositor is, or is closely affiliated with, a broker and/or a Participant in DTC. FIG. 3B reflects an idealized system for managing and trading Security Receipts. This system is implemented to track, record, and enable the transactions for creating and supporting the Security Receipts. The Trustee, via a network 200 including plural workstations 210, tracks the number of securities per Security Receipt, the ownership (via the prior art system shown in FIG. 1), the aggregate Security Receipts issued by that Trustee, and the aggregate shares held in the Trust. Workstations 210 preferably include an input/output mechanism by which operators may enter information and also by which operators may be presented with information. Workstations 210 also include an interfacing mechanism for communicating information over network 200.

The system of FIG. 3B preferably is equipped to issue receipts based on various groups of securities, or on a single security, such as listed in Table I below.

TABLE I

Pharmaceutical Industry
Internet Industry

TABLE I-continued

Biotech Industry
Genetics segment of Biotech Industry
Top twenty market capitalization stocks in the S&P 500 Index In this example, HOLDR is a trademark for a Security Receipt. An example portfolio for an Internet HOLDR is presented in Table II below:

TABLE II

| | |
|---|---|
| AMAZON.COM INC | HEALTHEON CORP |
| AMERICA ONLINE INC | INFOSEEK CORP |
| AT HOME CORP | INKTOMI CORP |
| CMGI INC | LYCOS INC |
| CNET INC | MINDSPRING ENTERPRISES INC |
| DOUBLECLICK | PRICELINE.COM INCORPORATED |
| EBAY INC | REALNETWORKS INC |
| E TRADE GROUP INC | USWEB CORP |
| EXODUS COMMUNICATIONS INC | YAHOO INC |

As baskets of securities are developed and packaged into Security Receipts, the new receipts are communicated to the other participants (brokers, banks, and the Trustee) via communication paths which, in the illustrative example of FIG. 3B, is a Communications Server 220, coupled via conventional technology to the communication medium of choice. It is to be understood that various forms of communication are within the contemplation of the invention, including any method for conveying information from one place to another, such as wireless communications, wired communications, fiber optics, internet (hypertext transfer, file transfer), and others. The Security Receipt information is transmitted to DTC, then to the Participant, and subsequently to the investor(s). On the other hand, when a Security Receipt is cancelled for the underlying security, the information flow goes essentially in the opposite direction (e.g., an investor communicates to his broker to cancel a Security Receipt, which is communicated to DTC, and then to the Trustee, who eventually delivers the underlying securities to the investor in exchange for the receipt).

FIG. 4 sets forth an operational sequence by which the Initial Depositor creates a Security Receipt facility (e.g., typically a security or a group of securities representing a conventional or synthetic industry sector). Depending on the origin of the underlying securities, a weighting and/or methodology, and possibly other criteria, are used to determine the particular stocks, and the number of shares of each stock, for creating the Security Receipt. Thus, an Initial Depositor may deposit 10,000, 5000, and 3000 shares of three separate companies into a newly formed Trust that issues 1000 Receipt, each Receipt representing 10, 5, and 3 shares, respectively, of the underlying securities, or may issue 10,000 Receipts, each representing 1, one-half, and ⅓ths shares, respectively, of the underlying securities (i.e., the latter being an example of a Security Receipt evidencing ownership of fractional shares). An Initial Depositor may also decide to create a Security Receipt of particular Internet stocks as shown above in Table II. The process begins conceptually at START block 300. At block 301, a new Issue of a Security Receipt is selected and, at block 320, this new Issue is assigned a system variable, Issue (J), where J is a counter to track Security Receipt issues. It should be understood that a completely separate entity may create a Trust that happens to have the exact same securities as the first Trust, and may create Security Receipts having the same mix (both particular securities and/or quantities of each) as the first Trustee created.

At test block 330, the processing mechanism determines if the new Issue is for an existing basket or a new basket—that is to say, whether the new Issue is for an existing collection of securities or, alternatively, for a new collection of underlying securities. If new, the processing mechanism branches to block 340 and a new basket is generated, denoted as Basket(I). At block 350, the characteristics of the basket are entered and can include security criteria, such as those listed in Table III.

TABLE III

| Security Type | Common Stock in Internet Sector |
|---|---|
| Market Cap | >1 billion (US$) |
| Trading Volume | >1 million shares/day |

Continuing with FIG. 4, at block 360, the underlying particular security information is entered, denoted as Securities(I); for example, the particular securities and the specific number of shares of each security that comprise each unit of the Security Receipt (or for all of the Security Receipts in a particular basket). Next, at block 370, provisions are made for multiple basket creation. If it is desired to create a multiple basket, the program loops back to block 340; otherwise, the program continues to block 420. At block 420, the Initial Depositor establishes a trust, hires a trustee, and arranges for the initial distribution of receipts to potential purchasers through, for example, an exchange.

Returning for a moment to block 330, if the new issue is based on an existing security basket, i.e., "Yes" to the test at block 330, the system recalls and selects an existing portfolio, block 380. At block 390, an option is provided to modify the portfolio, by adjusting the characteristics, Characteristics(I) block 400, and storing the new basket information, block 410. Processing continues again to block 420 as just described.

Turning now to FIG. 5, the system can, and preferably does, track dividend payments and voting rights for individual shares and transfers the payments and rights to the security owner, even though an owner may actually own a Security Receipt rather than owning the underlying security. In addition to dividends paid in cash and/or stock, the entity issuing the underlying security may have other distributions, including, for example, a special stock distribution, an annual or quarterly report, a special communication from the company (e.g., a picture of a new chief executive officer, or of a new facility or product), and the like. Processing preferably is on a periodic (e.g., daily) basis and begins conceptually at start block 500. The receipt basket, Basket (I), is entered, block 510, and the owner of record is identified, block 520. Test 530 determines if a dividend payment has been received for any of the securities within Basket(I); if so, logic branches to block 540. As described above with reference to FIG. 3B, the Trust monitors the amount of each security represented by a Security Receipt and the funds are released to pay the owner in accordance with the standard distribution methodology outlined in FIG. 1.

Similarly, at Test 550, issued voting rights for any of the underlying securities are detected. As described above with reference to FIG. 3B, the Trust monitors the amount of each security represented by a Security Receipt and the system then processes these by sending the proxy cards to the beneficial owner in accordance with the standard distribution methodology outlined in FIG. 1. This is repeated for each Security Receipt and logic continues at block 570. It may be that a particular security used for a Security Receipt is owned only in fractional amounts; in such a case, it may be that individual Security Receipt owners will not have sufficient beneficial ownership of such shares to vote, or it may be that the Trustee will vote those shares.

Figure 6:
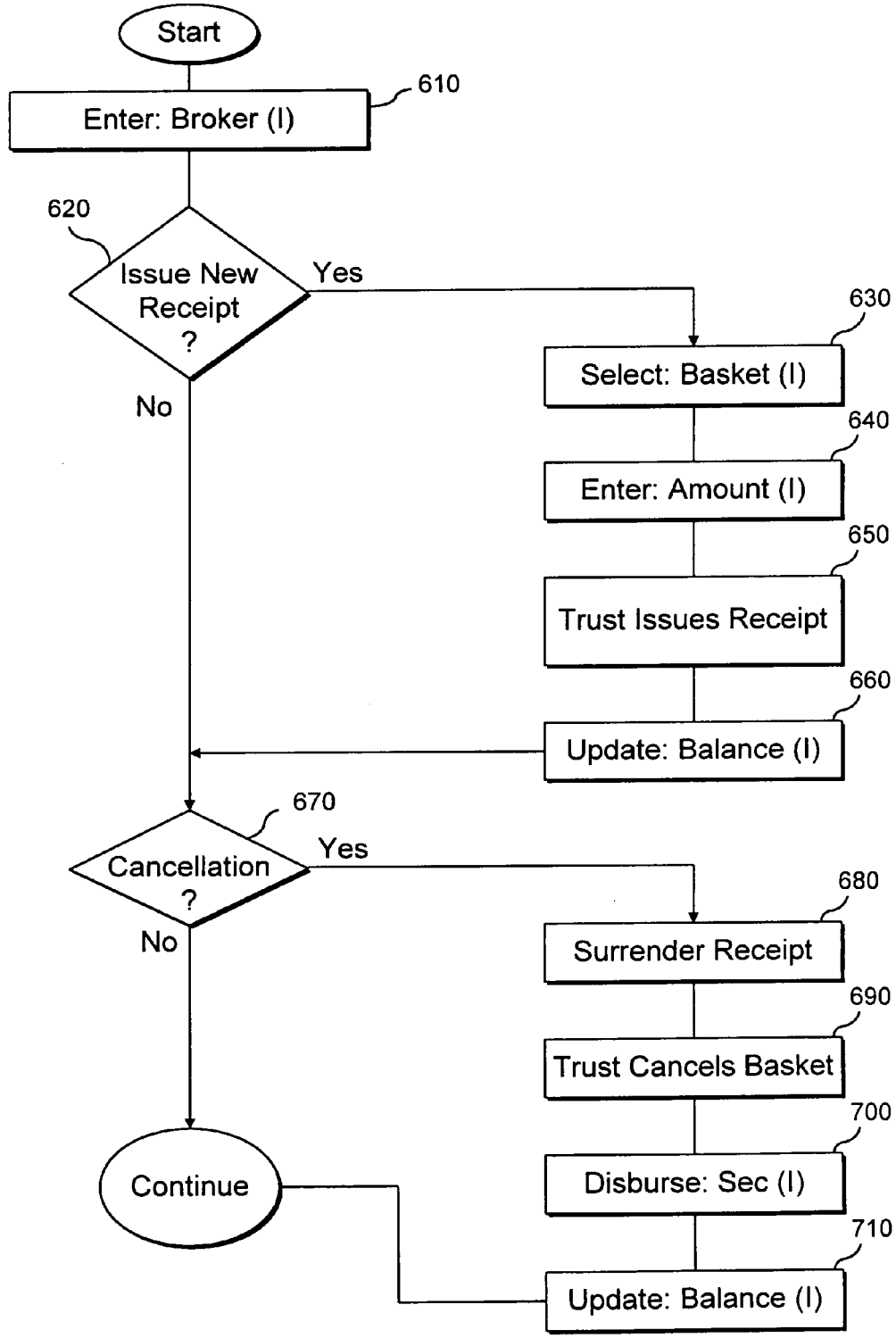
FIG. 6 is a flowchart setting forth the manner in which receipts may be purchased and/or exchanged.

An important attribute of the Security Receipt is the ability of the Trust to accept further deposits of underlying securities (or bundles thereof) in exchange for a newly issued Security Receipt, or to cancel the Security Receipt in exchange for the underlying securities. As shown in FIG. 6, this is accomplished by the system proprietor via access by Brokers, starting by entering a Broker ID, block 610. Test 620 determines if new Security Receipts are to be issued. This is, of course, different than buying existing Receipts from a trading exchange. If yes, logic branches to block 630 and the particular Security Receipt, Basket(I), is selected. An amount is entered (i.e., the number of receipts to be created), block 640. The broker must deliver to the Trust the required amount of underlying securities, whereupon the Trust issues Receipts, block 650, as described above in FIG. 3A. Based on the new Receipts created, the Trustee must update the aggregate number of securities held by the Trust and the aggregate number of outstanding Securities Receipts issued by the Trust, block 660.

Continuing in FIG. 6, Security Receipts may be cancelled in exchange for the underlying securities; this is tested for at Test 670. If an exchange is requested, the receipts are surrendered to the Trustee, block 680, the Trustee cancels the receipt, block 690, and finally the underlying securities are disbursed, block 700. Based on the cancelled receipts, the Trustee again must update the aggregate of the securities held by the Trust and the aggregate number of outstanding Securities Receipts issued by the Trust, block 710.

The above processes are actually record keeping operations wherein title changes but physical transfers are at a minimum. While presented in a sequentially controlled, hierarchial format, this is for illustrative purpose only. As will be recognized by those skilled in the art, there are obvious alternate processing regimens available for implementing the Security Receipts of the present invention, expressed in different source or object code and preferred on a variety of integrated platforms, or dispersed locations and entities.

Attached to the earlier filed Provisional Application No. 60/145,730 is an amended Form S-1 filed with the U.S. Securities and Exchange Commission, Registration Statement No. 333-78575, the disclosure of which is incorporated herein by reference. This Registration Statement is a prospectus describing a particular embodiment of the Trust-issued receipt.

After the receipt has been issued, market events may necessitate adjustment of the basket in accordance with programmed protocols. This process is illustrated in FIGS. 7 and 8, using a merger and tender offer as illustrative adjustment events.

Figure 7:
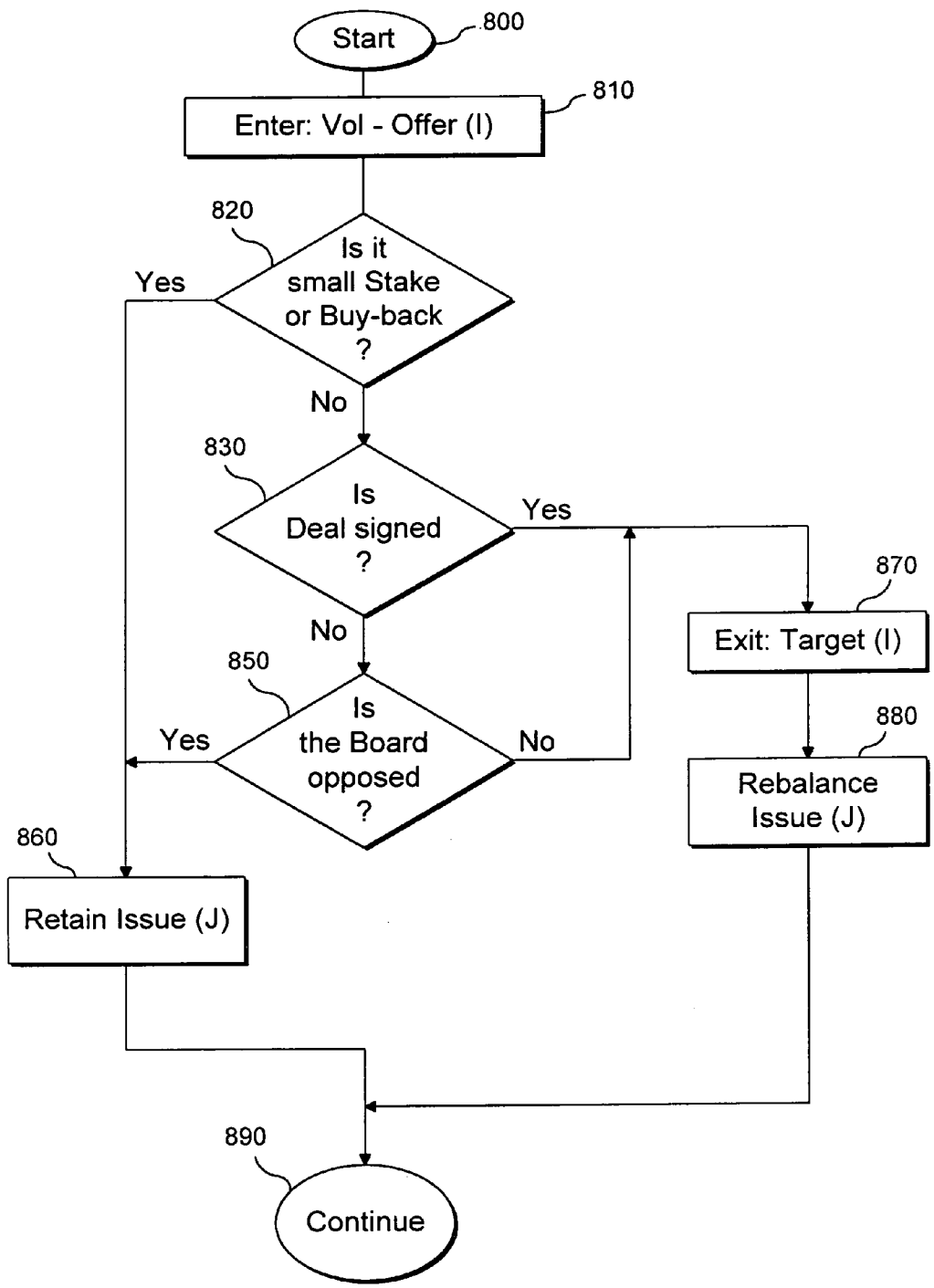
FIG. 7 is a flow chart depicting system response to events such as tender offers.

Turning first to FIG. 7, the system provides response to substantive transactions of securities held in the select basket, and, in particular, reacts to a tender offer for shares in a stock within the receipt. Logic conceptually starts at block 800, with the particulars of the tender offer entered at block 810 and stored in variable Vol_Offer(I). At Test 820, the system determines whether the offer is for a small stake or reflects a management buy-back of outstanding shares. If positive, logic branches to block 860, and the system processes the transaction with no modification to the Issue(J).

Continuing with FIG. 7, at Test 830, the system detects whether the tender offer reflects a consummated agreement with the management of the target company. If the response is positive, logic branches to block 870, and, upon commencement of the Tender/Exchange period, the system removes the stock from the basket forming the Issue(J). The Issues's remaining shares are then rebalanced at block 880. If, however, the board opposes the tender offer, Test 850, logic branches to block 860, and the Issue(J) is not modified.

Figure 8:
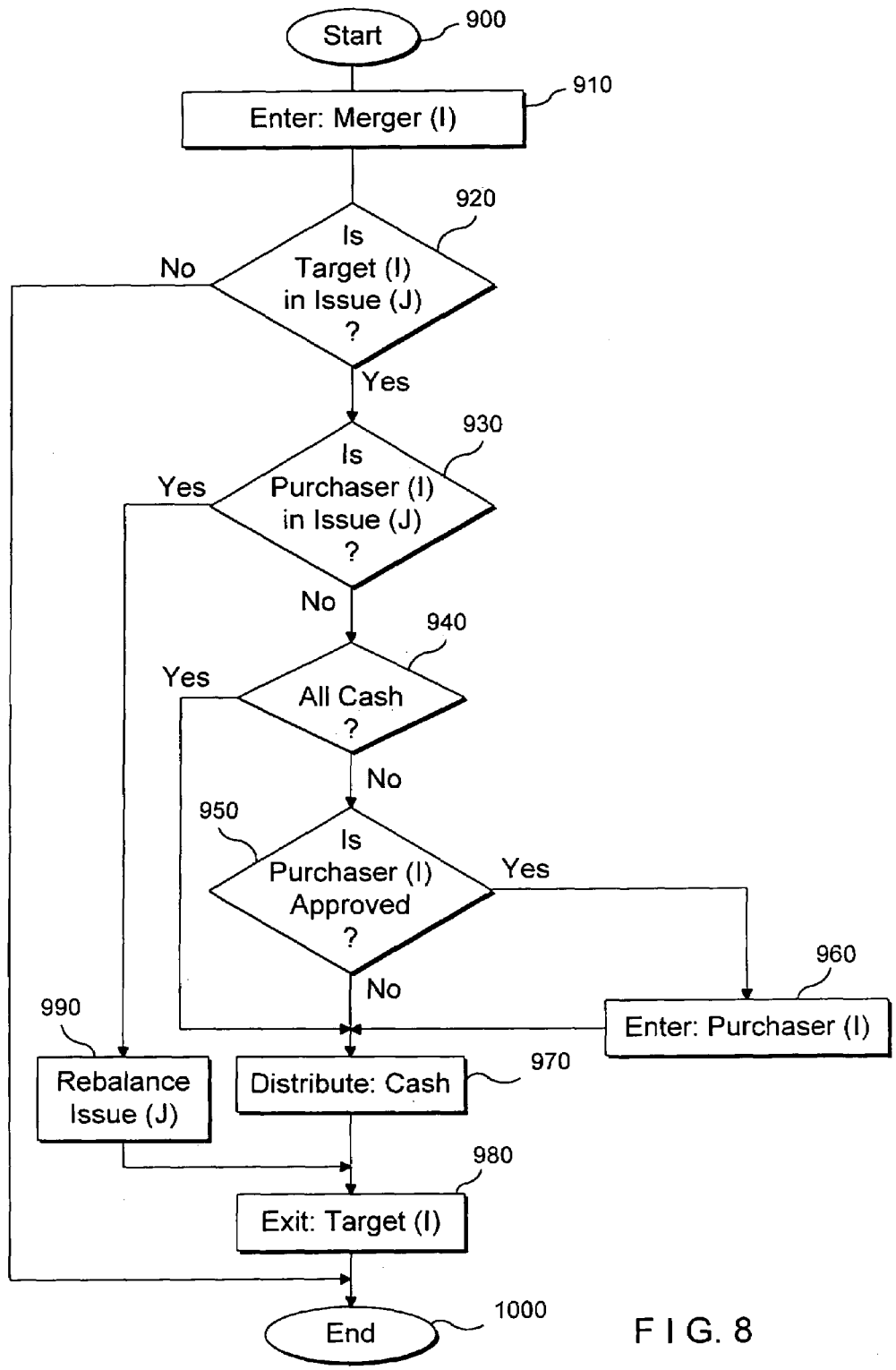
FIG. 8 is a flow chart depicting system response to events such as mergers.

A similar program protocol exists for mergers involving stocks within the Issue, as shown in FIG. 8. The merger parameters are entered at block 910, followed by the determination of whether the merger Target company, Target(I) is part of the Issue(J). If not, the system branches logic and the Issue is not modified. A positive response to Test 920 is followed by Test 930 which tests whether the merger Purchaser(I) is in the Issue(J). If so, this means both companies involved in the merger are in the Issue, and logic branches to block 990, and the system rebalances the receipt to reflect the changed values of the basket due to the merger. This is followed by system removal of Target(I), block 980.

Returning to Test 930, a negative response is followed by the determination of an all cash merger at Test 940. If yes, logic shifts to block 970 and the cash is distributed for the Target company shares. The target is then removed from the Issue(J) at 980 and logic continues 1000. If, however, in response to Test 930, the merger is less than all cash—either part cash or all shares of the purchasing company, logic continues to Test 950. At this juncture, the system determines if the purchaser is approved. System approval of a purchaser can be on a number of basis depending on the Issue administrator. One basis of approval is listing on a major exchange; additional requirements may be conformation to the Issue profile, e.g., an internet business.

If approved, logic shifts to block 960, and the system accepts purchaser stock for the Target company shares, reconfiguring the Issue to include the new stock. Logic then continues as before, distributing any cash portion of the merger price, block 970, and removing the target shares from the Issue, block 980.

Although the invention has been described in detail for the purpose of illustration, it is to be understood that such detail is solely for that purpose and that variations can be made therein by those skilled in the art without departing from the spirit and scope of the invention.

What is claimed is:

1. A system for managing one or more Security Receipts, each said Security Receipt evidencing a beneficial interest in a plurality of pre-existing underlying securities, said securities including at least two securities associated with entities independent of each other, the system comprising:
   a computer system with associated memory for storing data relating to the underlying securities, including data regarding a Trust holding said underlying securities, and the one or more Security Receipts;
   wherein said computer system is operable to manage transactions associated with said Security Receipts, said transactions comprising one or more of:
   issuance of said one or more Security Receipts having said beneficial interest, based on said underlying securities;
   acceptance of a deposit of said underlying securities in exchange for one or more newly issued Security Receipts; and
   cancellation of one of said one or more Security Receipts in exchange for said underlying securities.

2. The system of claim 1, wherein the underlying securities for said Security Receipt have a common characteristic.

3. The system of claim 1, further comprising means for trading Security Receipts.

4. The system of claim 1, further comprising means permitting an owner of a Security Receipt to vote an underlying security.

5. The system of claim 1, further comprising means for distributing a dividend granted or other distribution with respect to a security underlying a Security Receipt to the owner of the Security Receipt.

6. A system as in claim 1, wherein said underlying securities comprise a plurality of stocks, wherein a first stock in said plurality of stocks represents ownership rights in a first company and a second stock in said plurality of stocks represents ownership rights in a second company, and wherein said first company and said second company are not part of and have never been part of the same company.

7. A system as in claim 1, wherein said underlying securities comprise stock in a plurality of separate companies within a particular industry, said separate companies not being part of and never having been part of the same company.

8. A system as in claim 1, wherein said underlying securities comprise a plurality of securities, wherein a first security in said plurality of securities provides first ownership rights and a second security in said plurality of securities provides second ownership rights, and said first and second ownership rights are not and have never been identical.

9. A system as in claim 1, wherein said beneficial interest comprises the same rights, privileges, and obligations as exist regarding beneficial ownership of individual securities of said underlying securities.

10. A system as in claim 1, wherein said beneficial interest comprises the right to vote common stock of at least one company corresponding to an individual security of said underlying securities.

* * * * *